(12) United States Patent
Von Der Heidt et al.

(10) Patent No.: US 7,016,500 B1
(45) Date of Patent: Mar. 21, 2006

(54) CODE EXCHANGE PROTOCOL

(75) Inventors: Guido Von Der Heidt, Krailling (DE); Joachim Velten, Biedenkopf (DE); Peter Söhne, Röhrmoos (DE)

(73) Assignee: Rohde & Schwarz SIT GmbH, Berlin (DE)

( * ) Notice: Subject to any disclaimer, the term of this patent is extended or adjusted under 35 U.S.C. 154(b) by 0 days.

(21) Appl. No.: 09/646,387

(22) PCT Filed: Mar. 18, 1999

(86) PCT No.: PCT/DE99/00771

§ 371 (c)(1),
(2), (4) Date: Sep. 18, 2000

(87) PCT Pub. No.: WO99/48240

PCT Pub. Date: Sep. 23, 1999

(30) Foreign Application Priority Data

Mar. 18, 1998 (DE) ................................ 198 11 833

(51) Int. Cl.
*H04L 9/00* (2006.01)
(52) U.S. Cl. .................. 380/282; 380/30; 380/46; 713/171
(58) Field of Classification Search ............ 380/30, 380/46, 282; 713/171
See application file for complete search history.

(56) References Cited

U.S. PATENT DOCUMENTS

| 4,956,863 | A | * | 9/1990 | Goss ........................... 380/30 |
| 5,150,411 | A | * | 9/1992 | Maurer ........................ 380/30 |
| 5,515,441 | A | | 5/1996 | Faucher |
| 5,633,933 | A | | 5/1997 | Aziz |
| 5,953,420 | A | * | 9/1999 | Matyas et al. ............. 713/171 |
| 5,966,445 | A | * | 10/1999 | Park et al. ................. 713/180 |
| 6,151,395 | A | * | 11/2000 | Harkins ...................... 380/286 |
| 2002/0001382 | A1 | * | 1/2002 | Anshel et al. ................ 380/30 |

FOREIGN PATENT DOCUMENTS

| CH | 678 134 | 7/1991 |
| DE | 39 22 642 | 1/1991 |
| EP | 0 739 105 | 10/1996 |

OTHER PUBLICATIONS

Whitfield Diffie and Martin E. Hellman, New Directions in Cryptography, Nov. 1976, IEEE, vol. IT-22, No. 644-654.*
Bruce Schneier, Applied Cryptography, Copyright 1996, Katherine Schowalter Publisher, No. 518-522.*
B. Schneier, "Angewandte Kryptographie" *Bonn, Addison-Wesley*, 1996, pp. 587-589.
E. Okamoto, "Key Distribution System Based on Identification", *IEEE Journal on Selected Areas in Communications*, vol. 7, No. 4, May 1989, pp. 481-485.

* cited by examiner

*Primary Examiner*—Hosuk Song
*Assistant Examiner*—Linh L D Son
(74) *Attorney, Agent, or Firm*—Young & Thompson

(57) ABSTRACT

A method of secure communication in which communication partners (A, B) in each case have a secret (S) and a public code (P), in which the communication partner (A) selects a random number (x) and the communication partner (B) selects a random number (y), in which a first partial code (Ax) is formed by the communication partner (A) and a second partial code (By) is formed by the communication partner (B) by using the public code (P) of the respective partner (B, A) and is transmitted to the respective other communication partner (B, A). A session code ($g^{xy}$, $g^{yx}$) is formed from the private random number (x, y), and the partial code (By, Ax) of the respective communication partner (B, A) while using the private secret code (S), the partial codes (Ax, By) and the session codes ($g^{xy}$, $g^{yx}$) being calculated in a fashion similar to the Diffie-Hellmann protocol.

3 Claims, No Drawings

CODE EXCHANGE PROTOCOL

BACKGROUND OF THE INVENTION

The invention relates to a code exchange protocol using the Diffie-Hellman protocol with an end-to-end authentication.

Encryption methods and coding devices serve to protect the confidentiality of information which is to be transmitted. In this case, use is made of cryptoalgorithms in which an encoded text, also termed cryptotext, which is not to be capable of interpretation by third parties is generated at the transmitting end from useful information, the plain text, which is to be protected, by using a code which is to be kept secret. The code which is to be kept secret is denoted as session code. In the case of a symmetrical encryption method, the same session code is required at the receiving end in order to recover the plain text from the encoded text.

In the case of a confidential communication, both communication partners must have the same session code, which is not permitted to be accessible to an unauthorized person. In order to ensure this, the session code is generally exchanged at or before the start of the communication by hyperencryption made of a code of a higher hierarchy, or by a special code agreement protocol.

In the case of the use of hyperencryption codes, be they symmetrical methods or modern asymmetrical methods such as, for example, the RSA method, the secret code must be stored permanently in the encryption device. If the device falls into the hands of an attacker, the latter can read out the secret code and thereby subsequently decrypt previously recorded information, that is to say encoded texts. In order to prevent this, substantial technical outlay is frequently undertaken, in order to make it difficult or impossible for codes to be read out from an encryption device (tamper-proof devices).

In the case of code exchange protocols according to the Diffie-Hellman type of method (W. Diffie, M. E. Hellman, New Directions in Cryptography, IEEE Transactions on Information Theory 6, 1976, pages 644 and 654), by contrast, no such code storage is required. In the case of this method, use is made of so-called one-way functions to agree a symmetrical communication code between the subscribers.

A one-way function is understood to be invertible function F of a set X in a set Y, so that y=F(x) is "easy" to calculate for all x from X, while the inverse $F^{-1}(y)$ is "difficult" to calculate. If the decryption mapping belonging to an encryption mapping is not known, the encryption function of any cryptosystem should appear as a one-way function. The code exchange method of Diffie and Hellman is based on a special class of one-way functions which have a particular commutative property.

General advice on cryptography is to be found in the book by W. Fumie and H. W. Ries, Kryptographie, Entwurf und Analyse symmetrischer Kryptosysteme [Cryptography, design and analysis of symmetrical cryptosystems], published by R. Oldenburg Verlag Munich, Vienna, 1998, ISBN 3-486-20868-3.

By contrast with the hyperencryption principle, in the case of a code exchange method in accordance with Diffie-Hellman, there is no safeguarded cryptographic information on the communication partner with whom the connection is established. Consequently, so-called man-in-the-middle attacks are possible, in which the attacker pretends to each of the communication partners to be the respective other one, and can thus also read the information.

SUMMARY OF THE INVENTION

The objection of the invention is to specify an encryption method for messages in the case of which the participating partners can be authenticated and the messages are protected against subsequent decryption.

One advantage of the encryption method according to the invention resides in the relatively low outlay on computation, since only a comparatively small number of exponentiations are required.

DESCRIPTION OF THE PREFERRED EMBODIMENTS

The invention is described below with the aid of an exemplary embodiment.

The basic idea of the invention resides in combining the Diffie-Hellman method and a public-key encryption method. This combination constitutes a clearly less complicated code exchange protocol than a combination of the classical Diffie-Hellman protocol with signature protocols.

The basis of the encryption method according to the invention is, by analogy with the Diffie-Hellman method, a large primary number p and a generating element g of the group of the coprime residue classes mod p. In a fashion similar to the RSA method, each of the communication partners A and B has an individual secret code $S_A$ and $S_B$. It holds for the secret code S that:

$$S(1 \leq S < p-1, ggT(S, p-1)=1)$$

let $S^{-1}$ be the inverse of S mod p−1, that is to say $S S^{-1}=1$ mod (p−1).

Furthermore, each of the communication partners A and B has an individual public code $P_A$ and $P_B$. It holds for the public code P that:

$$P = g^S \bmod p$$

In a variant of the invention, it holds for the public code P that:

$$P = g^{S^{-1}} \bmod p$$

Two further variants of the invention are based on an arbitrary group G with a generating element g, and the public code P is calculated in accordance with the following calculating role:

$$P = g^S \text{ or } P = g^{S^{-1}}, \text{ respectively.}$$

It is assumed that the communication partner A has the public code PB of the communication partner B, and that the communication partner B has the public code PA of the communication partner A. As a rule, this is achieved by embedding the public code P in certificates of a trustworthy agency and exchanging certificates between the communication partners A, B before the data exchange (see, for example B. Schneier, Angewandte Kryptographie [Applied cryptography], Addison-Wesley 1996, pages 219ff).

Before the start of communication, party A selects an x as random number and forms a partial code Ax=PBX mod p and sends this to party B. Party B selects a y as random number and forms a partial code By=$P_A^y$ mod p and sends this to party A.

Party A forms a session code $g^{xy}$ mod p from his random number x and the partial code BY of party B.

$$g^{xy} = (P_A^Y)^{x \cdot S^{-1}_A} \bmod p.$$

Party B forms a session code $g^{yx}$ from his random number y and the partial AX of Party A.

$$g^{yx} = (P_B{}^x)^{yS^{-1}{}_B} \bmod p$$

The two codes $g^{xy} \bmod p$ and $g^{yx} \bmod p$ are equal to one another and form the symmetrical session code for the actual confidential communication.

By using the asymmetrical pair of codes $S_A$, $P_A$ and $S_B$, $P_B$ to form the session code $g^{yx} \bmod p$, an end-to-end authentication of the parties A and B is achieved once again a man-in-the-middle attack is impossible. However, in this case even an attacker who takes charge of both devices is not able also to read any previously recorded messages by reading out the (inverse) private codes $S_A{}^{-1}$ and $S_B{}^{-1}$, since knowledge of $xS_A{}^{-1}$ or $yS_B{}^{-1}$ is necessary to calculate the session key $g^{xy} \bmod p$, and x and y have been selected at random as in the classical Diffie-Hellman protocol. These random numbers x at party A and y at party B are not stored in the device.

Reading out the private code S or $S^{-1}$ can compromise only future communications of this device by a man-in-the-middle attack. However, for this purpose the attacker must succeed in returning such a device by subterfuge to the lawful user after reading out the code. The use of a stolen device can be prevented in the usual way by enabling the public code.

In the case of the above protocol, two modular exponentiations are to be carried out at both ends (in parallel), as in the Diffie-Hellman protocol. As a result, the aim of linking the Diffie-Hellman protocol to an end-to-end authentication without increasing the number of required, time-consuming exponentiations is achieved. The combination of the Diffie-Hellman protocol with signature procotols (RSA, DSA, etc.) is substantially more complicated and requires additional time-consuming mathematical operations (at least one modular exponentiation).

The method according to the invention can be carried out analogously with any desired groups in which the discrete logarithm problem is difficult to solve. Examples of such groups are the multiplicative group of finite bodies (of non-prime order) or elliptical curves over finite bodies.

In general, the method according to the invention is based on the following protocol:

Let G be a group with a generating element g, the discrete logarithm problem being active in G. Examples of such groups are the multiplicative groups of finite bodies and elliptical curves, or subgroups of such groups.

It holds for the secret code S that:

0<S<number of elements of G=Q, ggT S, Q=1 $S^{-1}$ is the inverse of S mod Q.

It holds for the public code P that:

$$P = g^s$$

The calculation of the common session code $g^{xy}$ is then performed by analogy with the previously outlined method, the basis being the arithmetic of the group G.

The outlined variant of the Diffie-Hellman protocol can be used to exchange a common session code in any desired cryptosystem. The only assumption is that a two-way protocol is possible for the code exchange.

The invention includes an end-to-end authentication of the communication partners and solves the problem of storing secret codes in cryptodevices. The low number of required exponentiations results in a decisive advantage in the case of all applications such as, for example, voice encryption, in the case of which long connection setup times cannot be tolerated. Given a module length of 1024 bits and the processors typically used in encryption devices, approximately 1 to 1.5 seconds of execution time are to be estimated as guide values for a modular exponentiation.

What is claimed is:

1. A secure communication method, comprising the steps of:

providing each communication partner (A,B) with a respective secret code (S) and a respective public code (P);

first communication partner (A) selecting a first random number (x);

second communication partner (B) selecting a second random number (y);

the first communication partner forming a first partial code (Ax) using the public code of the second communication partner ($P_B$) raised to a power of the first random number (x);

the second communication partner forming a second partial code (By) using the public code of the first communication partner ($P_A$) raised to a power of the second random number (y);

transmitting the first partial code (Ax) to the second communication partner and transmitting the second partial code (By) to the first communication partner;

the first communication partner forming a first session code ($g^{xy}$) from the second partial code (By) raised to a power of first random number (x) and a power of the secret code of the first communication partner ($S_A$); and the second communication partner forming a second session code ($g^{yx}$) from the first partial code (Ax) raised to a power of second random number (y) and a power of the secret code of the second communication partner ($S_B$).

2. A secure communication method, comprising the steps of:

providing each communication partner (A,B) with a respective secret code (S) and a respective public code (P);

first communication partner (A) selecting a first random number (x);

second communication partner (B) selecting a second random number (y);

the first communication partner forming a first partial code (Ax) using the public code of the second communication partner ($P_B$) raised to a power of the first random number (x);

the second communication partner forming a second partial code (By) using the public code of the first communication partner ($P_A$) raised to a power of the second random number (y);

transmitting the first partial code (Ax) to the second communication partner and transmitting the second partial code (By) to the first communication partner;

the first communication partner forming a first session code ($g^{xy}$) from the second partial code (By) raised to a power of first random number (x) and a power of the secret code of the first communication partner ($S_A$);

the second communication partner forming a second session code ($g^{yx}$) from the first partial code (Ax) raised to a power of second random number (y) and a power of the secret code of the second communication partner ($S_B$); and wherein the first session code ($g^{xy}$) is:

$$g^{xy}=(By)^{xS_A} \bmod p=(P_A{}^y)^{xS_A} \bmod p$$

where $P_A{}^y$ is the public code of the first communication partner raised to the power of the second random number y, and $S_A$ is the secret code of the first communication partner, and wherein the second session code ($g^{yx}$) is:

$$g^{yx}=(Ax)^{yS_B} \bmod p=(P_B{}^x)^{yS_B} \bmod p$$

where $P_B{}^x$ is the public code of the second communication partner raised to the power of the first random number x, and $S_B$ is the secret code of the second communication partner.

3. A secure communication method, comprising the steps of:
- providing each communication partner (A, B) with a respective secret code (S) and a respective public code (P);
- first communication partner (A) selecting a first random number (x);
- second communication partner (B) selecting a second random number (y);
- the first communication partner forming a first partial code (Ax) by using the arithmetic of an elliptical curve on a public code of the second communication partner ($P_B$) and the first random number (x);
- the second communication partner forming a second partial code (By) by using the arithmetic of an elliptical curve on a public code of the first communication partner ($P_A$) and the second random number (y);
- transmitting the first partial code (Ax) to the second communication partner and transmitting the second partial code (By) to the first communication partner;
- the first communication partner forming a first session code ($g^{xy}$) by using the arithmetic of an elliptical curve on the second partial code (By), the first random number (x) and the secret code of the first communication partner ($S_A$); and
- the second communication partner forming a second session code ($g^{xy}$) by using the arithmetic of an elliptical curve on the first partial code (Ax), the second random number (y) and the secret code of the second communication partner ($S_B$).

\* \* \* \* \*